United States Patent
Parrish

(10) Patent No.: US 6,748,872 B2
(45) Date of Patent: Jun. 15, 2004

(54) SWIRL-PRODUCING FUEL INJECTION NOZZLE AND SYSTEM AND METHOD INCORPORATING SAME

(75) Inventor: Scott E. Parrish, Farmington Hills, MI (US)

(73) Assignee: Bombardier Motor Corporation of America, Grant, FL (US)

(*) Notice: Subject to any disclaimer, the term of this patent is extended or adjusted under 35 U.S.C. 154(b) by 124 days.

(21) Appl. No.: 10/005,769

(22) Filed: Nov. 8, 2001

(65) Prior Publication Data

US 2003/0084869 A1 May 8, 2003

(51) Int. Cl.[7] .............................. B05B 5/00; B05B 17/00
(52) U.S. Cl. .................. 123/305; 239/464; 239/533.15; 239/584; 123/472
(58) Field of Search ................................. 123/305, 472; 239/533.12, 533.15, 461, 463, 464, 533.2, 584, 585.1

(56) References Cited

U.S. PATENT DOCUMENTS

| | | | | |
|---|---|---|---|---|
| 2,154,875 A | * | 4/1939 | Streby | 239/453 |
| 4,408,722 A | * | 10/1983 | Frelund | 239/453 |
| 4,991,780 A | * | 2/1991 | Kannan et al. | 239/440 |
| 5,020,728 A | * | 6/1991 | Linder et al. | 239/533.12 |
| 5,405,088 A | * | 4/1995 | Gordon et al. | 239/453 |
| 5,755,385 A | * | 5/1998 | Potz et al. | 239/533.2 |
| 6,042,028 A | * | 3/2000 | Xu | 239/585.1 |
| 6,155,499 A | * | 12/2000 | Rembold et al. | 239/533.12 |
| 6,484,700 B1 | * | 11/2002 | Kimmel et al. | 123/531 |

FOREIGN PATENT DOCUMENTS

DE    3221770 A1  * 12/1983

OTHER PUBLICATIONS

XU, M. et al., CFD Aided Development of Spray for an Outwardly Opening Direct Injection Gasoline Injector, Direct Injection SI Engine Technology, Feb. 1998, pp. 101–113.

* cited by examiner

Primary Examiner—Henry C. Yuen
Assistant Examiner—Arnold Castro
(74) Attorney, Agent, or Firm—Ziolkowski Patent Solutions Group, LLC

(57) ABSTRACT

A technique is provided for controlling fluid flow characteristics in a nozzle assembly. An outwardly opening poppet is movably disposed in an axial conduit to control fluid flow through a forward portion of the axial conduit. A fluid conduit is coupled to the forward portion at an angle configured to provide a desired degree of fluid swirl through the forward portion. The outwardly opening nozzle assembly produces a spray having geometrical characteristics correlated to the desired degree of fluid swirl.

63 Claims, 7 Drawing Sheets

SWIRL-PRODUCING FUEL INJECTION NOZZLE AND SYSTEM AND METHOD INCORPORATING SAME

BACKGROUND OF THE INVENTION

1. Field of the Invention

The present invention relates generally to the field of internal combustion engine injection systems. More particularly, the invention relates to a technique for controlling spray characteristics of a spray assembly by introducing fluid swirl near the exit of an outwardly opening nozzle.

2. Description of the Related Art

In fuel-injected engines, it is generally considered desirable that each injector delivers approximately the same quantity of fuel in approximately the same temporal relationship to the engine for proper operation. It is also well known that the fuel-air mixture affects the combustion process and the formation of pollutants, such as sulfur oxides, nitrogen oxides, hydrocarbons, and particulate matter. Although combustion engines utilize a variety of mixing techniques to improve the fuel-air mixture, many combustion engines rely heavily on spray assemblies to disperse fuel throughout a combustion chamber. These spray assemblies may produce a variety of spray patterns, such as a hollow or solid conical spray pattern, which affect the overall fuel-air mixture in the combustion chamber. It is generally desirable to provide a uniform fuel-air mixture to optimize the combustion process and to eliminate pollutants. However, conventional combustion engines continue to operate inefficiently and produce pollutants due to poor fuel-air mixing in the combustion chamber.

Accordingly, the present technique provides various unique features to overcome the disadvantages of existing spray systems and to improve the fuel-air mixture in combustion engines. In particular, unique features are provided to enhance the fluid flow through an outwardly opening nozzle assembly to provide desired spray characteristics.

SUMMARY OF THE INVENTION

The present technique offers a design for internal combustion engines that contemplates such features. The technique is applicable to a variety of fuel injection systems, and is particularly well suited to pressure pulsed designs, in which fuel is pressurized for injection into a combustion chamber by a reciprocating electric motor and pump. However, other injection system types may benefit from the technique described herein, including those in which fuel and air are admitted into a combustion chamber in mixture. Accordingly, the present technique comprises a system and method for controlling fluid flow characteristics in a nozzle assembly. An outwardly opening poppet is movably disposed in an axial conduit to control fluid flow through a forward portion of the axial conduit. A fluid conduit is coupled to the forward portion at an angle configured to provide a desired degree of fluid swirl through the forward portion. The outwardly opening nozzle assembly produces a spray having geometrical characteristics correlated to the desired degree of fluid swirl.

In one aspect, the present technique provides a nozzle comprising an axial conduit, a plurality of fluid conduits, and an outwardly opening poppet disposed in the axial conduit. The axial conduit comprises rear and forward portions. The plurality of fluid conduits are coupled to the forward portion and include lateral portions configured for controlling fluid swirl through the forward portion. The outwardly opening poppet is configured for controlling fluid flow through the forward portion.

In another aspect, the present technique provides a combustion engine comprising a combustion chamber, an ignition assembly and a nozzle assembly coupled to the combustion chamber, and a fuel delivery assembly coupled to the nozzle assembly. The nozzle assembly comprises an outwardly opening flow controller disposed in an axial conduit and a fuel conduit coupled to a forward portion of the axial conduit. The fuel conduit also includes an angular portion configured for controlling fuel swirl through the forward portion.

In another aspect, the present technique provides a method for producing a spray. The method comprises manipulating an outwardly opening nozzle to control flow through a forward portion of an axial passage. The method also comprises feeding fluid angularly to the forward portion to rotate the fluid and control geometrical characteristics of a spray formed at an exit of the forward portion.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
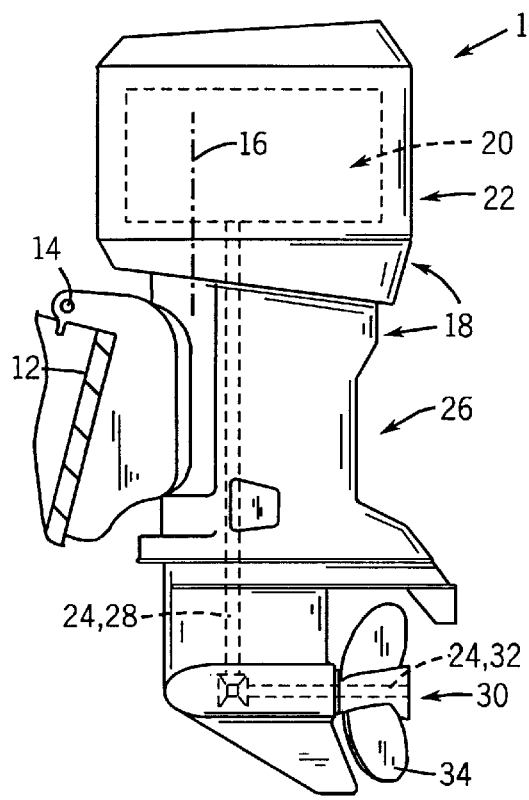
FIG. 1 is a side view of a marine propulsion device embodying an outboard drive or propulsion unit adapted for mounting to a transom of a watercraft.
Figure 2:
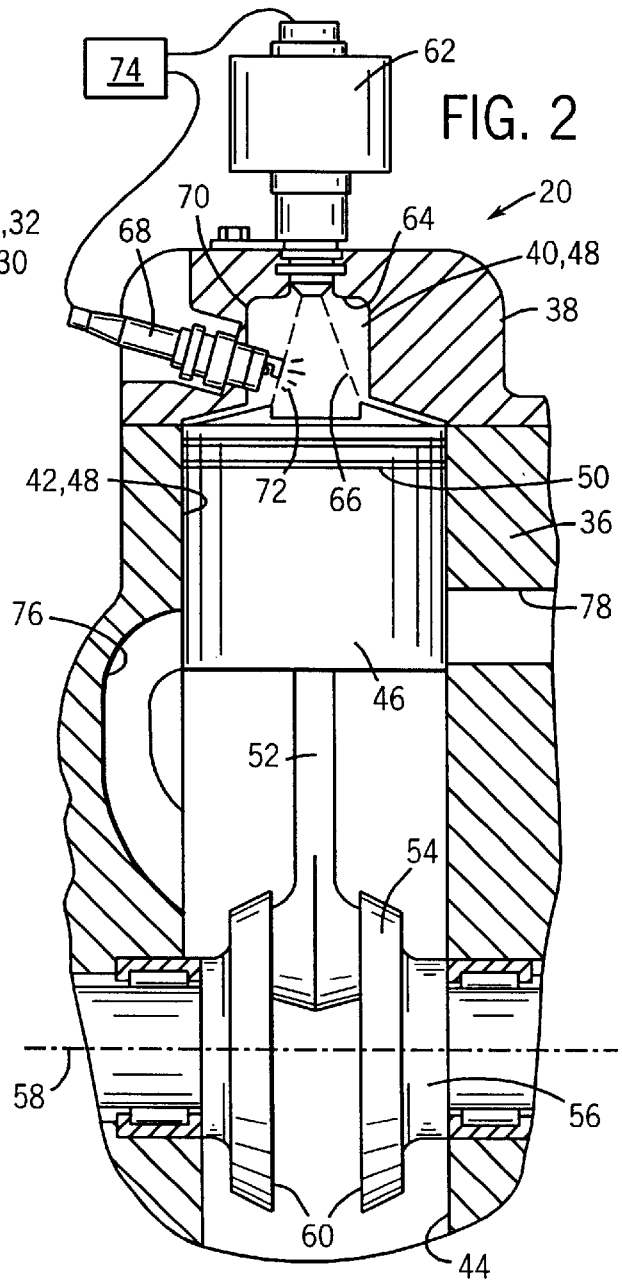
FIG. 2 is a cross-sectional view of the combustion engine.

The present technique will be described with respect to a 2-cycle outboard marine engine as illustrated in FIGS. 1–2. However, it will be appreciated that this invention is equally applicable for use with a 4-cycle engine, a diesel engine, or any other type of internal combustion engine having at least fuel injector, which may have one or more geometrically varying fluid passageways leading to a nozzle exit. The present technique is also applicable in other applications utilizing fluid spray assemblies, such as a nozzle producing a hollow or solid cone-shaped droplet spray.

FIG. 1 is a side view of a marine propulsion device embodying an outboard drive or propulsion unit 10 adapted to be mounted on a transom 12 of a watercraft for pivotal tilting movement about a generally horizontal tilt axis 14 and for pivotal steering movement about a generally upright steering axis 16. The drive or propulsion unit 10 has a housing 18, wherein a fuel-injected, two-stroke internal combustion engine 20 is disposed in an upper section 22 and a transmission assembly 24 is disposed in a lower section 26. The transmission assembly 24 has a drive shaft 28 drivingly coupled to the combustion engine 20, and extending longitudinally through the lower section 26 to a propulsion region 30 whereat the drive shaft 28 is drivingly coupled to a propeller shaft 32. Finally, the propeller shaft 32 is drivingly coupled to a prop 34 for rotating the prop 34, thereby creating a thrust force in a body of water. In the present technique, the combustion engine 20 may embody a four-cylinder or six-cylinder V-type engine for marine applications, or it may embody a variety of other combustion engines with a suitable design for a desired application, such as automotive, industrial, etc.

FIG. 2 is a cross-sectional view of the combustion engine 20. For illustration purposes, the combustion engine 20 is illustrated as a two-stroke, direct-injected, internal combustion engine having a single piston and cylinder. As illustrated, the combustion engine 20 has an engine block 36 and a head 38 coupled together and defining a firing chamber 40 in the head 38, a piston cylinder 42 in the engine block 36 adjacent to the firing chamber 40, and a crankcase chamber 44 in the engine block 36 adjacent to the piston cylinder 42. A piston 46 is slidably disposed in the piston cylinder 42, and defines a combustion chamber 48 adjacent to the firing chamber 40. A ring 50 is disposed about the piston 46 for providing a sealing force between the piston 46 and the piston cylinder 42. A connecting rod 52 is pivotally coupled to the piston 46 on a side opposite from the combustion chamber 48, and the connecting rod 52 is also pivotally coupled to an outer portion 54 of a crankshaft 56 for rotating the crankshaft 56 about an axis 58. The crankshaft 56 is rotatably coupled to the crankcase chamber 44, and preferably has counterweights 60 opposite from the outer portion 54 with respect to the axis 58.

In general, an internal combustion engine such as engine 20 operates by compressing and igniting a fuel-air mixture. In some combustion engines, fuel is injected into an air intake manifold, and then the fuel-air mixture is injected into the firing chamber for compression and ignition. As described below, the illustrated embodiment intakes only the air, followed by direct fuel injection and then ignition in the firing chamber.

A fuel injection system, having a fuel injector 62 disposed in a first portion 64 of the head 38, is provided for directly injecting a fuel spray 66 into the firing chamber 40. An ignition assembly, having a spark plug 68 disposed in a second portion 70 of the head 38, is provided for creating a spark 72 to ignite the fuel-air mixture compressed within the firing chamber 40. The control and timing of the fuel injector 62 and the spark plug 68 are critical to the performance of the combustion engine 20. Accordingly, the fuel injection system and the ignition assembly are coupled to a control assembly 74. As discussed in further detail below, the uniformity of the fuel spray 66 is also critical to performance of the combustion engine 20. The distribution of fuel spray 66 affects the combustion process, the formation of pollutants and various other factors.

In operation, the piston 46 linearly moves between a bottom dead center position (not illustrated) and a top dead center position (as illustrated in FIG. 2), thereby rotating the crankshaft 56 in the process of the linear movement. At bottom dead center, an intake passage 76 couples the combustion chamber 48 to the crankcase chamber 44, allowing air to flow from the crankcase chamber 44 below the piston 46 to the combustion chamber 48 above the piston 46. The piston 46 then moves linearly upward from bottom dead center to top dead center, thereby closing the intake passage 76 and compressing the air into the firing chamber 40. At some point, determined by the control assembly 74, the fuel injection system is engaged to trigger the fuel injector 62, and the ignition assembly is engaged to trigger the spark plug 68. Accordingly, the fuel-air mixture combusts and expands from the firing chamber 40 into the combustion chamber 48, and the piston 46 is forced downwardly toward bottom dead center. This downward motion is conveyed to the crankshaft 56 by the connecting rod 52 to produce a rotational motion of the crankshaft 56, which is then conveyed to the prop 34 by the transmission assembly 24 (as illustrated in FIG. 1). Near bottom dead center, the combusted fuel-air mixture is exhausted from the piston cylinder 42 through an exhaust passage 78. The combustion process then repeats itself as the cylinder is charged by air through the intake passage 76.

Figure 3:
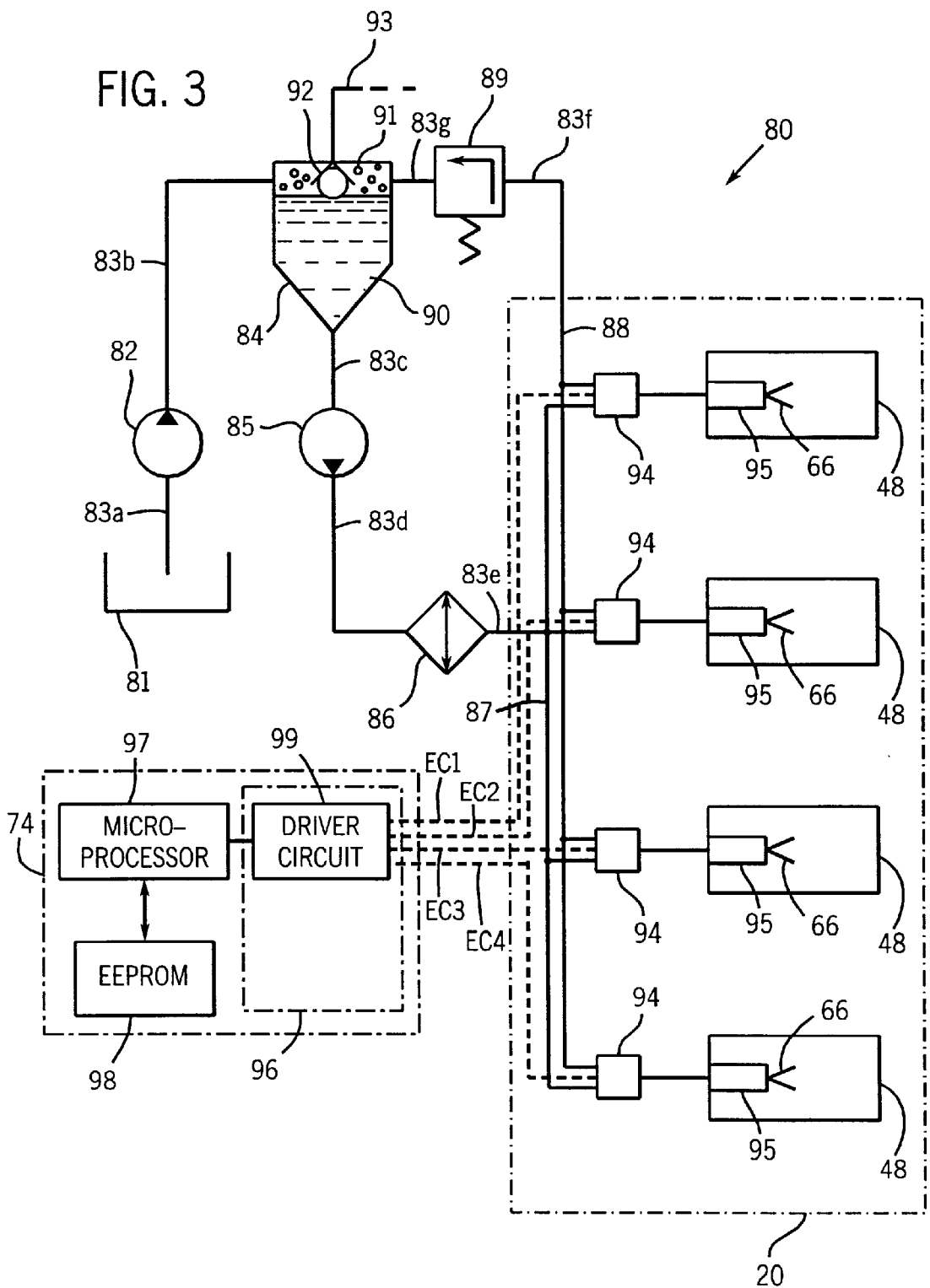
FIG. 3 is a diagrammatical representation of a series of fluid pump assemblies applied to inject fuel into an internal combustion engine.

Referring now to FIG. 3, the fuel injection system 80 is diagrammatically illustrated as having a series of pumps for displacing fuel under pressure in the internal combustion engine 20. While the fluid pumps of the present technique may be employed in a wide variety of settings, they are particularly well suited to fuel injection systems in which relatively small quantities of fuel are pressurized cyclically to inject the fuel into combustion chambers of an engine as a function of the engine demands. The pumps may be employed with individual combustion chambers as in the illustrated embodiment, or may be associated in various ways to pressurize quantities of fuel, as in a fuel rail, feed manifold, and so forth. Even more generally, the present pumping technique may be employed in settings other than fuel injection, such as for displacing fluids under pressure in response to electrical control signals used to energize coils of a drive assembly, as described below. Moreover, the system 80 and engine 20 may be used in any appropriate setting, and are particularly well suited to two-stroke applications such as marine propulsion, outboard motors, motorcycles, scooters, snowmobiles and other vehicles.

In the exemplary embodiment shown in FIG. 3, the fuel injection system 80 has a fuel reservoir 81, such as a tank for containing a reserve of liquid fuel. A first pump 82 draws the fuel from the reservoir 81 through a first fuel line 83a, and delivers the fuel through a second fuel line 83b to a separator 84. While the system may function adequately without a separator 84, in the illustrated embodiment, separator 84 serves to insure that the fuel injection system downstream receives liquid fuel, as opposed to mixed phase fuel. A second pump 85 draws the liquid fuel from separator 84 through a third fuel line 83c and delivers the fuel, through a fourth fuel line 83d and further through a cooler 86, to a feed or inlet manifold 87 through a fifth fuel line 83e. Cooler 86 may be any suitable type of fluid cooler, including both air and liquid heater exchangers, radiators, and the like.

Fuel from the feed manifold 87 is available for injection into combustion chambers of engine 20, as described more fully below. A return manifold 88 is provided for recirculating fluid not injected into the combustion chambers of the engine. In the illustrated embodiment a pressure regulating valve 89 is coupled to the return manifold 88 through a sixth fuel line 83*f* and is used for maintaining a desired pressure within the return manifold 88. Fluid returned via the pressure regulating valve 89 is recirculated into the separator 84 through a seventh fuel line 83*g* where the fuel collects in liquid phase as illustrated at reference numeral 90. Gaseous phase components of the fuel, designated by referenced numeral 91 in FIG. 3, may rise from the fuel surface and, depending upon the level of liquid fuel within the separator, may be allowed to escape via a float valve 92. The float valve 92 consists of a float that operates a ventilation valve coupled to a ventilation line 93. The ventilation line 93 is provided for permitting the escape of gaseous components, such as for repressurization, recirculation, and so forth. The float rides on the liquid fuel 90 in the separator 84 and regulates the ventilation valve based on the level of the liquid fuel 90 and the presence of vapor in the separator 84.

As illustrated in FIG. 3, engine 20 may include a series of combustion chambers 48 for collectively driving the crankshaft 56 in rotation. As discussed with reference to FIG. 2, the combustion chambers 48 comprise the space adjacent to a series of pistons 46 disposed in piston cylinders 42. As will be appreciated by those skilled in the art, and depending upon the engine design, the pistons 46 (FIG. 2) are driven in a reciprocating fashion within each piston cylinder 42 in response to ignition, combustion and expansion of the fuel-air mixture within each combustion chamber 48. The stroke of the piston within the chamber will permit fresh air for subsequent combustion cycles to be admitted into the chamber, while scavenging combustion products from the chamber. While the present embodiment employs a straightforward two-stroke engine design, the pumps in accordance with the present technique may be adapted for a wide variety of applications and engine designs, including other than two-stroke engines and cycles.

In the illustrated embodiment, the fuel injection system 80 has a reciprocating pump 94 associated with each combustion chamber 48, each pump 94 drawing pressurized fuel from the feed manifold 87, and further pressurizing the fuel for injection into the respective combustion chamber 48. In this exemplary embodiment, the fuel injector 62 (FIG. 2) may have a nozzle 95 (FIG. 3) for atomizing the pressurized fuel downstream of each reciprocating pump 94. While the present technique is not intended to be limited to any particular injection system or injection scheme, in the illustrated embodiment, a pressure pulse created in the liquid fuel forces the fuel spray 66 to be formed at the mouth or outlet of the nozzle 95, for direct, in-cylinder injection. The operation of reciprocating pumps 94 is controlled by an injection controller 96 of the control assembly 74. The injection controller 96, which will typically include a programmed microprocessor or other digital processing circuitry and memory for storing a routine employed in providing control signals to the pumps, applies energizing signals to the pumps to cause their reciprocation in any one of a wide variety of manners as described more fully below.

The control assembly 74 and/or the injection controller 96 may have a processor 97 or other digital processing circuitry, a memory device 98 such as EEPROM for storing a routine employed in providing command signals from the processor 97, and a driver circuit 99 for processing commands or signals from the processor 97. The control assembly 74 and the injection controller 96 may utilize the same processor 97 and memory as illustrated in FIG. 3, or the injection controller 96 may have a separate processor and memory device. The driver circuit 99 may be constructed with multiple circuits or channels, each individual channel corresponding with a reciprocating pump 94. In operation, a command signal may be passed from the processor 97 to the driver circuit 99, which responds by generating separate drive signals for each channel. These signals are carried to each individual pump 94 as represented by individual electric connections EC1, EC2, EC3 and EC4. Each of these connections corresponds with a channel of the driver circuit 99. The operation and logic of the control assembly 74 and injection controller 96 will be discussed in greater detail below.

Figure 4:
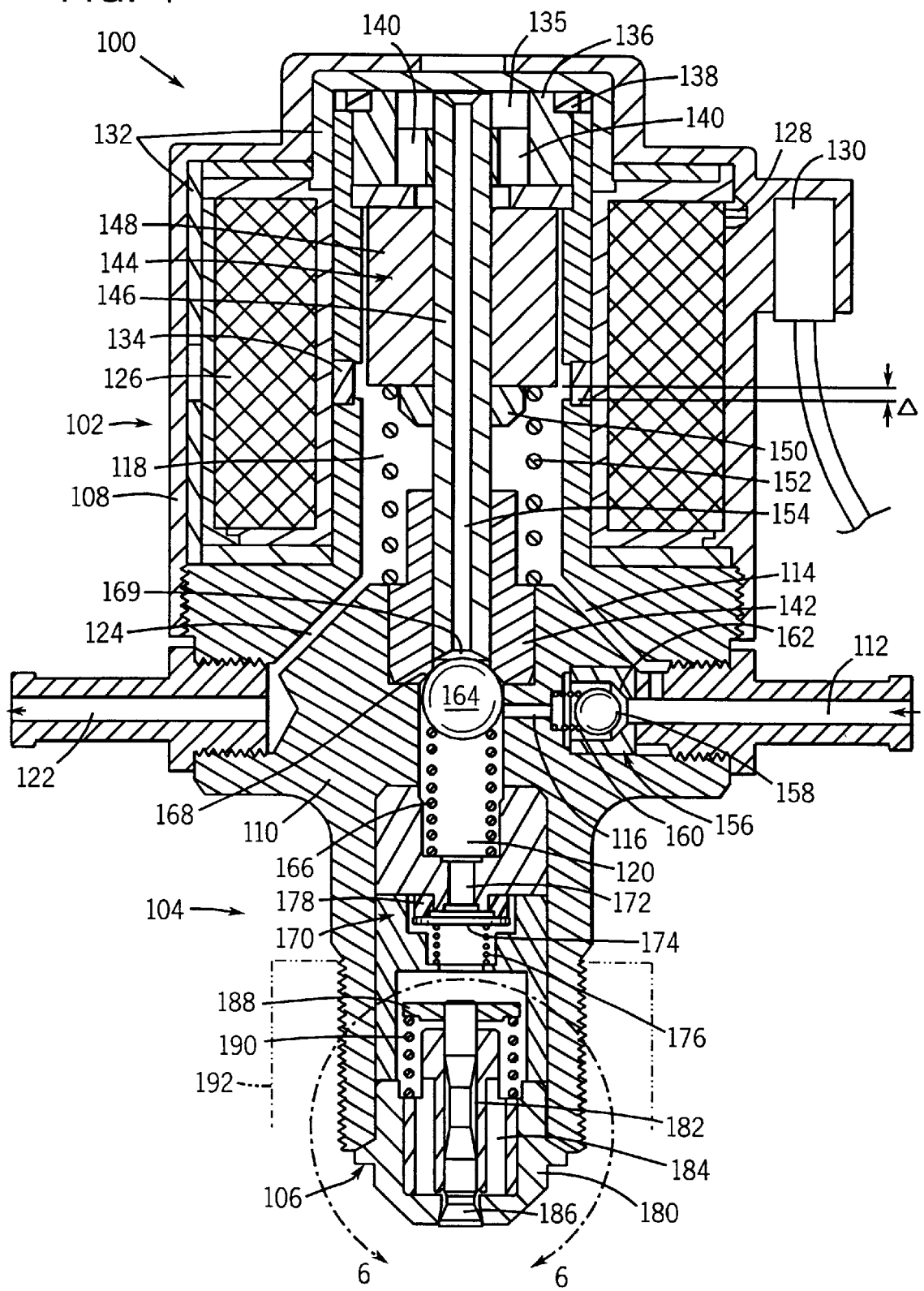
FIG. 4 is a partial cross-sectional view of an exemplary pump in accordance with aspects of the present technique for use in displacing fluid under pressure, such as for fuel injection into a chamber of an internal combustion engine as shown in FIG. 3.
Figure 5:
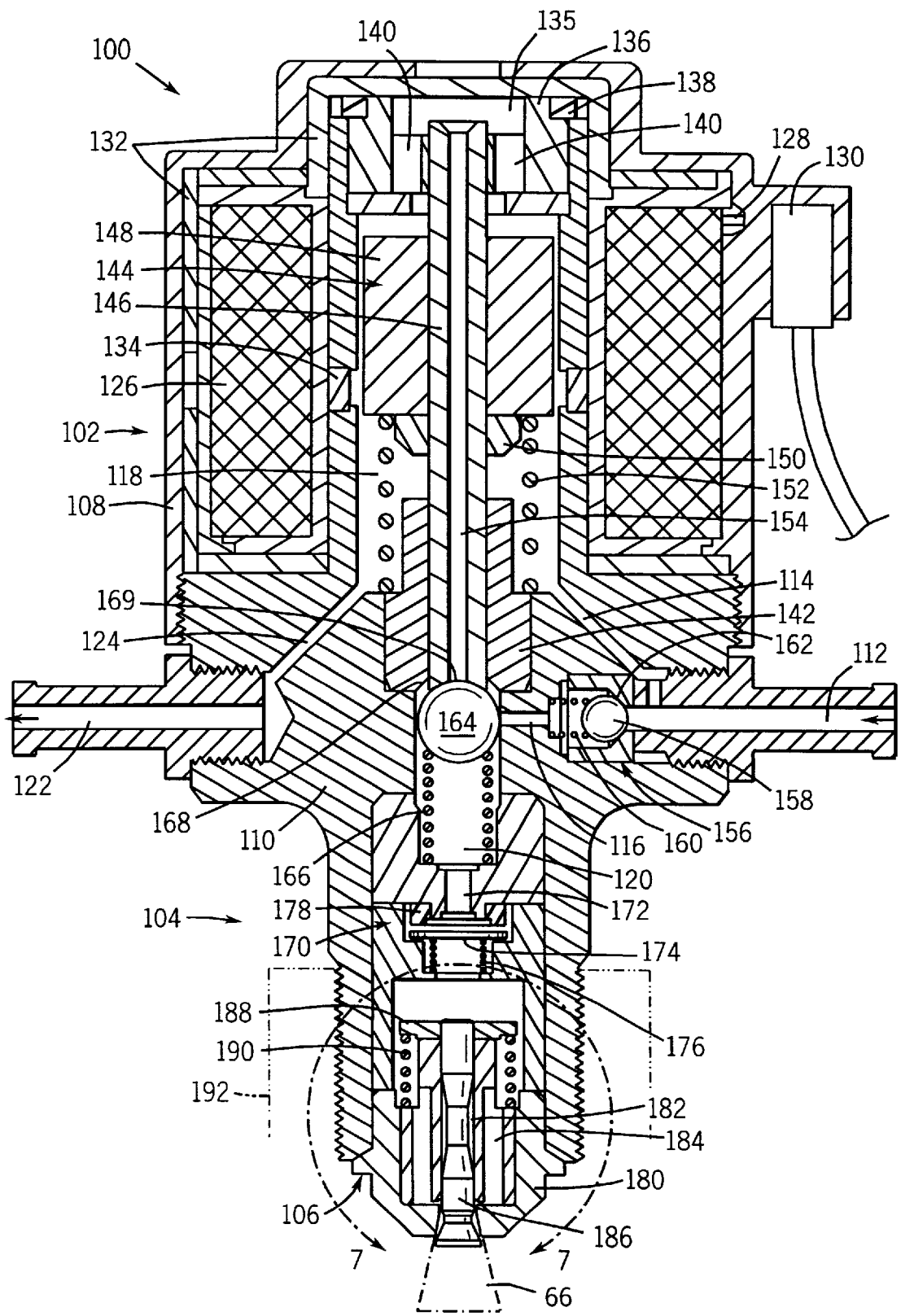
FIG. 5 is a partial cross-sectional view of the pump illustrated in FIG. 4 energized to an open position during a pumping phase of operation.

Specifically, FIG. 4 illustrates the internal components of a pump assembly including a drive section and a pumping section in a first position wherein fuel is introduced into the pump for pressurization. FIG. 5 illustrates the same pump following energization of a solenoid coil to drive a reciprocating assembly and thus cause pressurization of the fuel and its expulsion from the pump. It should be borne in mind that the particular configurations illustrated in FIGS. 4 and 5 are intended to be exemplary only. Other variations on the pump may be envisaged, particularly variants on the components used to pressurize the fluid and to deliver the fluid to a downstream application.

In the presently contemplated embodiment, a pump and nozzle assembly 100, as illustrated in FIGS. 4 and 5, is particularly well suited for application in an internal combustion engine, as illustrated in FIGS. 1–3. Moreover, in the embodiment illustrated in FIGS. 4 and 5, a nozzle assembly is installed directly at an outlet of a pump section, such that the pump 94 and the nozzle 95 of FIG. 3 are incorporated into a single assembly 100. As indicated above, in appropriate applications, the pump 94 may be separated from the nozzle 95, such as for application of fluid under pressure to a manifold, fuel rail, or other downstream component. Thus, the fuel injector 62 described with reference to FIG. 2 may comprise the nozzle 95, the pump and nozzle assembly 100, or other designs and configurations capable of fuel injection.

Referring to FIG. 4, an embodiment is shown wherein the fluid actuators and fuel injectors are combined into a single unit, or pump-nozzle assembly 100. The pump-nozzle assembly 100 is composed of three primary subassemblies: a drive section 102, a pump section 104, and a nozzle 106. The drive section 102 is contained within a solenoid housing 108. A pump housing 110 serves as the base for the pump-nozzle assembly 100. The pump housing 110 is attached to the solenoid housing 108 at one end and to the nozzle 106 at an opposite end.

There are several flow paths for fuel within pump-nozzle assembly 100. Initially, fuel enters the pump-nozzle assembly 100 through the fuel inlet 112. Fuel can flow from the fuel inlet 112 through two flow passages, a first passageway 114 and a second passageway 116. A portion of fuel flows through the first passageway 114 into an armature chamber 118. For pumping, fuel also flows through the second passageway 116 to a pump chamber 120. Heat and vapor bubbles are carried from the armature chamber 118 by fuel flowing to an outlet 122 through a third fluid passageway 124. Fuel then flows from the outlet 122 to the return manifold 88 (see FIG. 3).

The drive section 102 incorporates a linear electric motor. In the illustrated embodiment, the linear electric motor is a reluctance gap device. In the present context, reluctance is the opposition of a magnetic circuit to the establishment or flow of a magnetic flux. A magnetic field and circuit are produced in the motor by electric current flowing through a coil 126. The coil 126 is electrically coupled by leads 128 to a receptacle 130, which is coupled by conductors (not shown) to an injection controller 96 of the control assembly 74. Magnetic flux flows in a magnetic circuit 132 around the exterior of the coil 126 when the coil is energized. The magnetic circuit 132 is composed of a material with a low reluctance, typically a magnetic material, such as ferromagnetic alloy, or other magnetically conductive materials. A gap in the magnetic circuit 132 is formed by a reluctance gap spacer 134 composed of a material with a relatively higher reluctance than the magnetic circuit 132, such as synthetic plastic.

A reciprocating assembly 144 forms the linear moving elements of the reluctance motor. The reciprocating assembly 144 includes a guide tube 146, an armature 148, a centering element 150 and a spring 152. The guide tube 146 is supported at the upper end of travel by the upper bushing 136 and at the lower end of travel by the lower bushing 142. An armature 148 is attached to the guide tube 146. The armature 148 sits atop a biasing spring 152 that opposes the downward motion of the armature 148 and guide tube 146, and maintains the guide tube and armature in an upwardly biased or retracted position. Centering element 150 keeps the spring 152 and armature 148 in proper centered alignment. The guide tube 146 has a central passageway 154, which permits the flow of a small volume of fuel when the guide tube 146 moves a given distance through the armature chamber 118 as described below. Accordingly, the flow of fuel through the central passageway 154 facilitates cooling and acceleration of the guide tube 146, which is moved in response to energizing the coil during operation.

When the coil 126 is energized, the magnetic flux field produced by the coil 126 seeks the path of least reluctance. The armature 148 and the magnetic circuit 132 are composed of a material of relatively low reluctance. The magnetic flux lines will thus extend around coil 126 and through magnetic circuit 132 until the magnetic gap spacer 134 is reached. The magnetic flux lines will then extend to armature 148 and an electromagnetic force will be produced to drive the armature 148 downward towards the reluctance gap spacer 134. When the flow of electric current is removed from the coil by the injection controller 96, the magnetic flux will collapse and the force of spring 152 will drive the armature 148 upwardly and away from alignment with the reluctance gap spacer 134. Cycling the electrical control signals provided to the coil 126 produces a reciprocating linear motion of the armature 148 and guide tube 146 by the upward force of the spring 152 and the downward force produced by the magnetic flux field on the armature 148.

During the return motion of the reciprocating assembly 144 a fluid brake within the pump-nozzle assembly 100 acts to slow the upward motion of the moving portions of the drive section 102. The upper portion of the solenoid housing 108 is shaped to form a recessed cavity 135. An upper bushing 136 separates the recessed cavity 135 from the armature chamber 118 and provides support for the moving elements of the drive section at the upper end of travel. A seal 138 is located between the upper bushing 136 and the solenoid housing 108 to ensure that the only flow of fuel from the armature chamber 118 to and from the recessed cavity 135 is through fluid passages 140 in the upper bushing 136. In operation, the moving portions of the drive section 102 will displace fuel from the armature chamber 118 into the recessed cavity 135 during the period of upward motion. The flow of fuel is restricted through the fluid passageways 140, thus, acting as a brake on upward motion. A lower bushing 142 is included to provide support for the moving elements of the drive section at the lower travel limit and to seal the pump section from the drive section.

While the first fuel flow path 114 provides proper dampening for the reciprocating assembly as well as providing heat transfer benefits, the second fuel flow path 116 provides the fuel for pumping and, ultimately, for combustion. The drive section 102 provides the motive force to drive the pump section 104, which produces a surge of pressure that forces fuel through the nozzle 106. As described above, the drive section 102 operates cyclically to produce a reciprocating linear motion in the guide tube 146. During a charging phase of the cycle, fuel is drawn into the pump section 104. Subsequently, during a discharging phase of the cycle, the pump section 104 pressurizes the fuel and discharges the fuel through the nozzle 106, such as directly into the combustion chamber 48 (see FIG. 3).

During the charging phase fuel enters the pump section 104 from the inlet 112 through an inlet check valve assembly 156. The inlet check valve assembly 156 contains a ball 158 biased by a spring 160 toward a seat 162. During the charging phase the pressure of the fuel in the fuel inlet 112 will overcome the spring force and unseat the ball 158. Fuel will flow around the ball 158 and through the second passageway 116 into the pump chamber 120. During the discharging phase the pressurized fuel in the pump chamber 120 will assist the spring 160 in seating the ball 158, preventing any reverse flow through the inlet check valve assembly 156.

A pressure surge is produced in the pump section 104 when the guide tube 146 drives a pump sealing member 164 into the pump chamber 120. The pump sealing member 164 is held in a biased position by a spring 166 against a stop 168. The force of the spring 166 opposes the motion of the pump sealing member 164 into the pump chamber 120. When the coil 126 is energized to drive the armature 148 towards alignment with the reluctance gap spacer 134, the guide tube 146 is driven towards the pump-sealing member 164. There is, initially, a gap 169 between the guide tube 146 and the pump sealing member 164. Until the guide tube 146 transits the gap 169 there is essentially no increase in the fuel pressure within the pump chamber 120, and the guide tube and armature are free to gain momentum by flow of fuel through passageway 154. The acceleration of the guide tube 146 as it transits the gap 169 produces the rapid initial surge in fuel pressure once the guide tube 146 contacts the pump sealing member 164, which seals passageway 154 to pressurize the volume of fuel within the pump chamber 120.

Referring generally to FIG. 5, a seal is formed between the guide tube 146 and the pump-sealing member 164 when the guide tube 146 contacts the pump-sealing member 164. This seal closes the opening to the central passageway 154 from the pump chamber 120. The electromagnetic force driving the armature 148 and guide tube 146 overcomes the force of springs 152 and 166, and drives the pump-sealing member 164 into the pump chamber 120. This extension of the guide tube into the pump chamber 120 causes an increase in fuel pressure in the pump chamber 120 that, in turn, causes the inlet check valve assembly 156 to seat, thus stopping the flow of fuel into the pump chamber 120 and ending the charging phase. The volume of the pump chamber 120 will decrease as the guide tube 146 is driven into the pump chamber 120, further increasing pressure within the pump chamber 120 and forcing displacement of the fuel from the pump chamber 120 to the nozzle 106 through an outlet check valve assembly 170. The fuel displacement will continue as the guide tube 146 is progressively driven into the pump chamber 120.

Pressurized fuel flows from the pump chamber 120 through a passageway 172 to the outlet check valve assembly 170. The outlet check valve assembly 170 includes a valve disc 174, a spring 176 and a seat 178. The spring 176 provides a force to seat the valve disc 174 against the seat 178. Fuel flows through the outlet check valve assembly 170 when the force on the pump chamber side of the valve disc 174 produced by the rise in pressure within the pump chamber 120 is greater than the force placed on the outlet side of the valve disc 174 by the spring 176 and any residual pressure within the nozzle 106.

Once the pressure in the pump chamber 120 has risen sufficiently to open the outlet check valve assembly 170, fuel will flow from the pump chamber 120 to the nozzle 106. The nozzle 106 is comprised of a nozzle housing 180 having a central passage 182 and an outer passage(s) 184, a poppet 186 movably disposed in the central passage 182, a retainer 188, and a spring 190. The retainer 188 is attached to the poppet 186, and spring 190 applies an upward force on the retainer 188 that acts to hold the poppet 186 seated against the nozzle housing 180. A volume of fuel is retained within the nozzle 106 when the poppet 186 is seated. The pressurized fuel flowing into the nozzle 106 from the outlet check valve assembly 170 pressurizes this retained volume of fuel. The increase in fuel pressure applies a force that unseats the poppet 186. In this unseated position of the poppet 186, fuel flows through outer passage(s) 184, through a flow enhancing or swirl producing forward cavity, and out through the nozzle exit. As the fluid passes through this ring-shaped flow area, a thin conic-shaped sheet of the fluid disperses from the nozzle 106 and atomizes into a conic-shaped spray (e.g., fuel spray 66) having a ring-shaped cross-section, as discussed below. The pump-nozzle assembly 100 may be coupled to a cylinder head 192, such as the head 38 illustrated in FIG. 2, via male/female threads, a flange assembly, or any other suitable mechanical coupling. Thus, the fuel spray from the nozzle 106 may be injected directly into a cylinder.

When the drive signal or current applied to the coil 126 is removed, the drive section 102 will no longer drive the armature 148 towards alignment with the reluctance gap spacer 134, ending the discharging phase and beginning a subsequent charging phase. The spring 152 will reverse the direction of motion of the armature 148 and guide tube 146 away from the reluctance gap spacer 134. Retraction of the guide tube from the pump chamber 120 causes a drop in the pressure within the pump chamber, allowing the outlet check valve assembly 170 to seat. The poppet 186 similarly retracts and seats, and the spray of fuel into the cylinder is interrupted. Following additional retraction of the guide tube, the inlet check valve assembly 156 will unseat and fuel will flow into the pump chamber 120 from the inlet 112. Thus, the operating cycle the pump-nozzle assembly 100 returns to the condition shown in FIG. 4.

Figure 6:
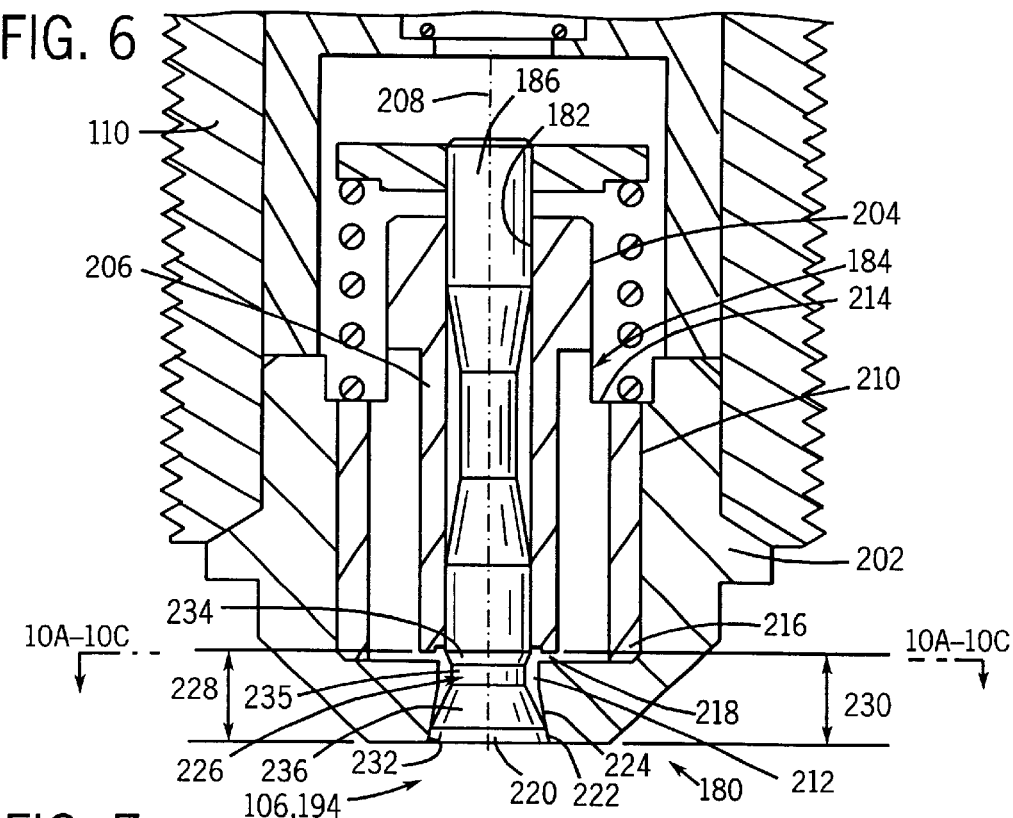
FIG. 6 is a partial cross-sectional view of an exemplary nozzle assembly in a closed position, as illustrated in FIG. 4.
Figure 7:
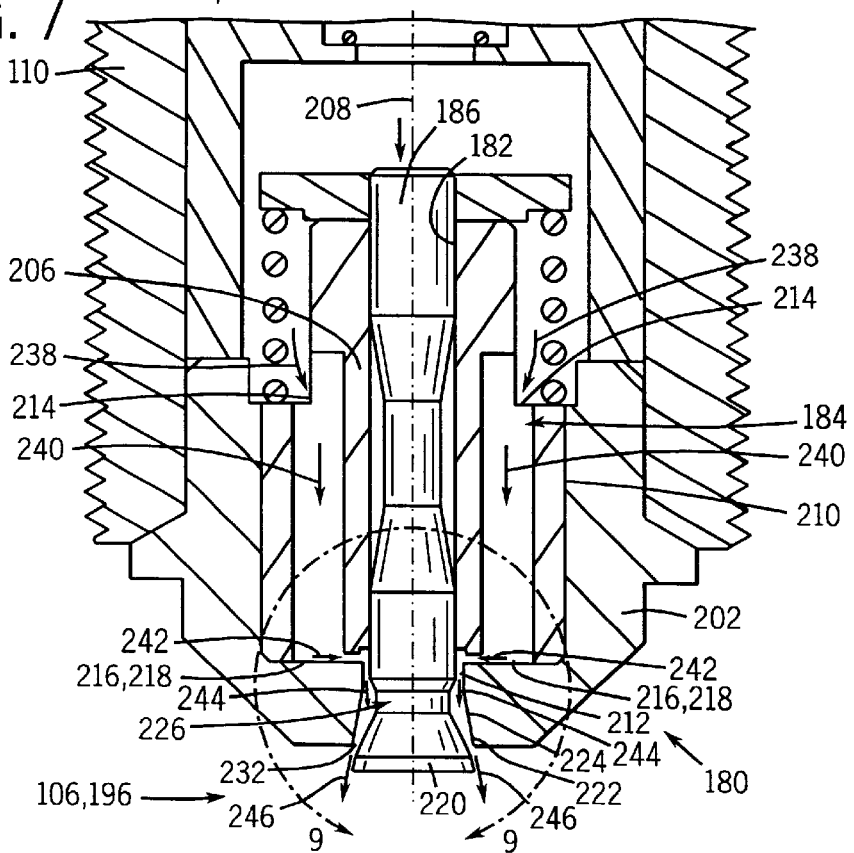
FIG. 7 is a partial cross-sectional view of the nozzle assembly in the open position, as illustrated in FIG. 5.
Figure 8:
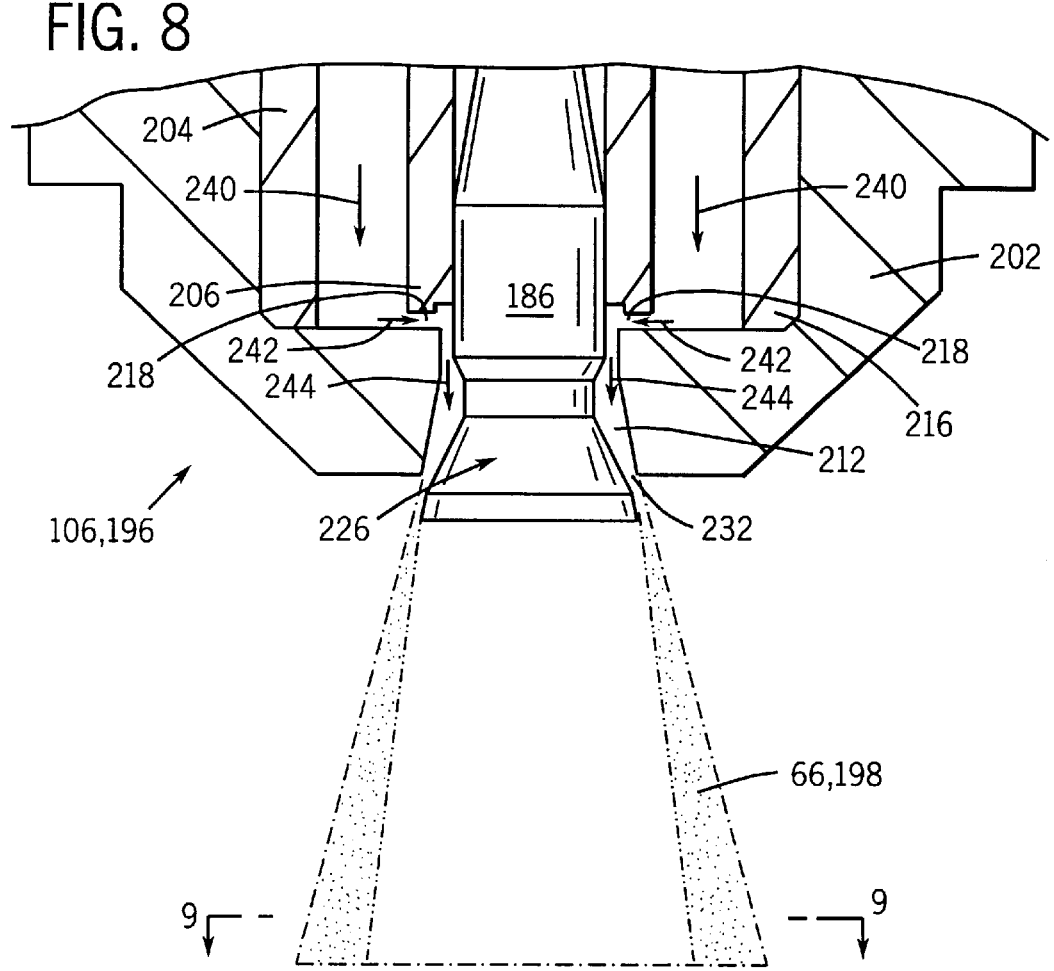
FIG. 8 is a cross-sectional view of an exemplary hollow spray formed by the nozzle assembly illustrated in FIG. 7.
Figure 9:
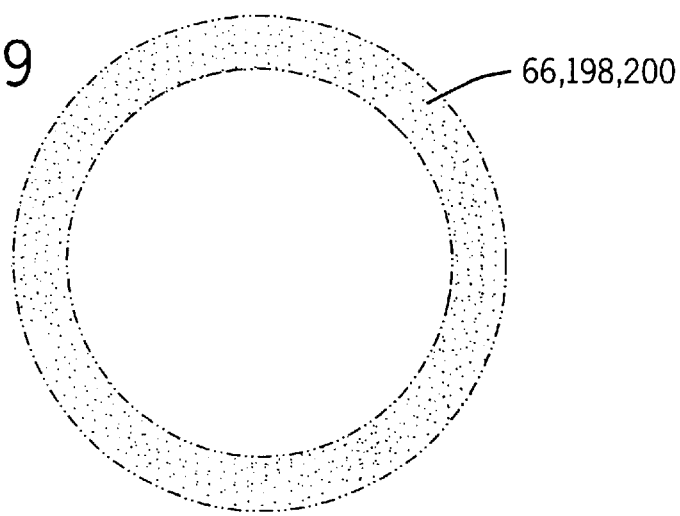
FIG. 9 is a cross-sectional view of the hollow spray illustrated in FIG. 8.

The nozzle 106 and corresponding fluid flows passing through and exiting from the nozzle 106 are illustrated in detail in FIGS. 6–11. In FIG. 6, the nozzle 106 is illustrated in a closed configuration 194 of the poppet 186 in the nozzle housing 180. FIGS. 7 and 8 illustrate the poppet 186 in an open configuration 196 relative to the nozzle housing 180. FIG. 8 also illustrates an exemplary hollow spray 198 formed by the nozzle 106 of the present technique. FIG. 9 then illustrates a uniform cross section 200 of the hollow spray 198 downstream of the nozzle 106. Various geometries of a frontal portion of the nozzle 106 are also illustrated in FIGS. 10a–10c, and corresponding hollow sprays are then illustrated in FIGS. 11a–11c. Accordingly, the flow passages and geometries of the nozzle 106 of the present technique facilitate desired flow characteristics within the nozzle 106 and desired spray properties exiting the nozzle 106, as illustrated in FIGS. 8–11.

Figure 10A:
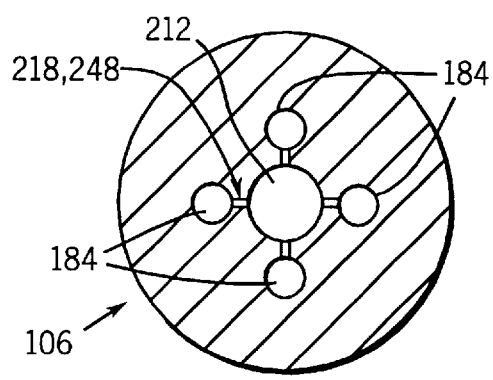
FIGS. 10A–C are cross-section views of a forward section of the nozzle assembly illustrating various fluid passage configurations for controlling fluid swirl.
Figure 10B:
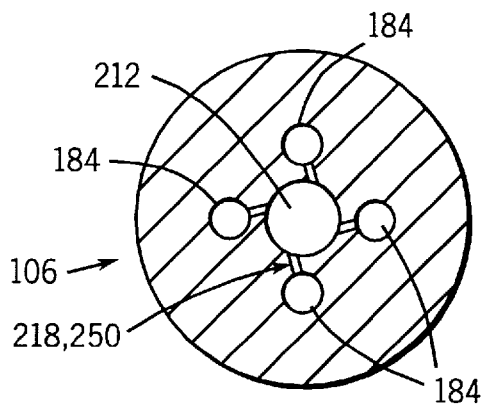
Figure 10C:
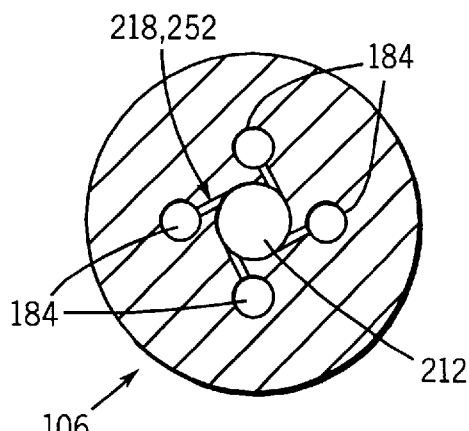

As illustrated in FIG. 6, the poppet 186 is movably disposed in the central passage 182 to control fluid flow through the nozzle housing 180. Accordingly the poppet 186 is movable between open and closed positions to control fluid flow into a forward cavity and out through a ring-shaped exit to form the hollow spray 198. The nozzle housing 180 includes an outer section 202 and an inner section 204, which has the central passage 182 passing lengthwise through the center of the inner section 204. The inner section 204 also has the longitudinal passage(s) 184 disposed about the poppet 186 and the central passage 182 separated by a wall 206. The inner section 204 is disposed in a rear cavity 210 of the outer section 202, which also has a forward cavity 212 disposed adjacent the rear cavity 210 and the inner section 204. As illustrated, the inner section 204 has an inlet 214 to the longitudinal passage(s) 184, which allows fluid flow through the longitudinal passage(s) 184 toward the forward cavity 212. At a forward portion 216 of the inner section 204, the longitudinal passages 184 extend into a plurality of radial passages 218, which are inwardly directed toward the forward cavity 212. The number of radial passages 218 may be matched to the number of longitudinal passage(s) 184, as illustrated in FIGS. 10A–10C, or any suitable number of the passages 184 and 218 may be utilized to provide the desired flow into and through the forward cavity 212. For example, one or more longitudinal passages 184 may extend into a ring shaped passage, which then feeds the radial passages 218. In this exemplary embodiment, the nozzle 106 has an equal number of the passages 184 and 218, while the radial passages 218 have a relatively smaller cross section than the longitudinal passage(s) 184. The radial passages 218 also may have a variety of geometries and angles to facilitate a desired fluid flow (e.g., fluid swirl or rotational fluid flow) into the forward cavity 212.

In the forward cavity 212, a seat portion 220 of the poppet 186 is seated against a seat portion 222 of the outer section 202 along an expanding section 224 of the outer section 202 (e.g., along, or at the tip of, the seat portions 220 and 222). The poppet 186 also has a desired geometry in the forward cavity 212 to facilitate desired flow characteristics for fluid exiting from the nozzle 106. As illustrated, the poppet 186 has a forward portion 226, which has a length 228 corresponding to a length 230 of the forward cavity 212. The lengths 228 and 230 are configured to provide a relatively small and compact geometry of the forward cavity 212 to facilitate desired flow characteristics adjacent an exit 232 of the nozzle 106. As illustrated, the forward portion 226 has a contracting section 234, followed by a central section 235 and an expanding section 236 adjacent the seat portions 220 and 222. Accordingly, as discussed in detail below, the geometry and configuration of the longitudinal passage(s) 184, the radial passage 218, the forward cavity 212, and the forward portion 226 of the poppet 186 facilitate desired flow characteristics through the nozzle 106 and desired spray characteristics exiting the nozzle 106 at the exit 232.

The two-piece assembly of the inner and outer sections 204 and 202 also provides flexibility in the design of the flow passages (e.g., longitudinal passage(s) 184, radial passages 218, and forward cavity 212) and the poppet 186. In the area leading up to forward cavity 212 (i.e., in the central passage 182), the poppet 186 may have any suitable geometry, such as a straight cylindrical geometry, one or more guide sections formed between reduced diameter sections, or any other geometry to facilitate movement of the poppet 186 through the central passage 182. Accordingly, the poppet 186 may be manufactured as a simple cylindrical needle having the forward portion 226 comprising only the expanding section 236 and seat portion 220. In contrast to conventional nozzles, the poppet 186 can be formed without flow passages in the guide section, which typically cause high flow velocities and undesirable fluid flow variations through the nozzle assembly.

The inner and outer sections 204 and 202 also may comprise different materials to facilitate the desired functions, durability and characteristics. For example, the inner section 204 may comprise brass or another suitable material to facilitate movement of the poppet 186 along the central passage 182, while the outer section 202 may comprise stainless steel or another suitable material to facilitate resistance to corrosion and wear due to combustion at the nozzle tip. A workable material such as brass also may improve the manufacturing of the inner section 204, which requires a substantial amount of drilling and other machining.

FIG. 7 is a side view of the nozzle 106 in the open configuration 196, illustrating exemplary fluid flows through the longitudinal passage(s) 184, the radial passages 218 and the forward cavity 212. As illustrated, fluid flows through the nozzle 106 as indicated by arrows 238, 240, 242, 244, and 246, which correspond to fluid flows through the inlet 214, the longitudinal passage(s) 184, the radial passages 218, the forward cavity 212, and out of the nozzle 106 through the exit 232, respectively. In this exemplary embodiment, the fluid flows through the longitudinal passage(s) 184 rather than through the central passage 182 about the poppet 186. In operation, fluid flows longitudinally through the longitudinal passage(s) 184 to the radial passages 218, which then constrict and direct the fluid flow inwardly relative to the centerline 208 to enhance the flow entering the forward cavity 212 and exiting the nozzle 106.

The characteristics of the fluid flow through the nozzle 106 can be controlled by varying the configuration and geometry of the longitudinal passage(s) 184, the radial passages 218, the forward cavity 212 and the forward portion 226. For example, the longitudinal passage(s) 184 may be configured as a single passage disposed adjacent the wall 206, or it may comprise a plurality of individual passages (e.g., 4, 6 or 8 cylindrical passages) disposed symmetrically about the wall 206. The foregoing longitudinal passage(s) 184 also may have a variety of longitudinal geometries, orientations and flow patterns relative to the centerline 208. For example, the longitudinal passage(s) 184 may extend along the inner section 204 in either a straight orientation (i.e., parallel to the centerline 208) or in a swirl, or angular, orientation (i.e., twisting lengthwise about the centerline 208). The radial passages 218 also may have a variety of cross-sections, longitudinal geometries, orientations and flow patterns. The lengthwise path of the radial passages 218 may be straight or curved, such as S-shaped, while immediate entry angle of the radial passages 218 into the forward cavity 212 may direct the fluid either toward or about the centerline 208. For example, the radial passages 218 may direct the fluid flow inwardly toward the centerline 208, inwardly toward an offset relative to the centerline 208, or inwardly in an oblique angle or tangent to the forward cavity 212. The particular entry angle and geometry of the radial passages 218 effectively control the degree of rotational motion (i.e., fluid swirl) of the fluid flowing into the forward cavity 212. A sharper angle increases the degree of rotational motion. A smaller cross-sectional area of the radial passages 218 also increases the effective rotational motion by increasing the fluid velocity entering the forward cavity 212 at the offset angle. The geometry of the forward portion 226 also may be modified to facilitate any other desired flow characteristic As illustrated in FIGS. 8 and 9, the geometry and configuration of the nozzle 106 provides the hollow spray 198 with the uniform cross section 200. The uniformity of the hollow spray 198 and the cross section 200 are attributed to the exemplary geometries and configurations of the longitudinal passage(s) 184, the radial passages 218, and the forward cavity 212. The foregoing geometries and configurations ensure a desired fluid flow to the forward cavity 212 and provide desired flow characteristics (e.g., swirl) to enhance the spray characteristics of the hollow spray 198 (e.g., spray penetration, droplet size, etc.). In general, the degree of swirl in the forward cavity 212 controls the degree of spray penetration and droplet size of the resulting spray.

An increase in rotational motion generally causes the hollow spray 198 to spread at a wider angle, which causes a greater crosswise penetration, a smaller lengthwise penetration, and a generally smaller droplet size in the hollow spray 198. The smaller droplet size can be attributed to the more aggressive thinning of the fluid sheet exiting from the nozzle to form the spray. In general, the fluid sheet thins as it flows away from the nozzle exit and grows in diameter. The wider angle, and greater crosswise penetration, increases this thinning effect of the fluid sheet. Alternatively, a decrease in rotational motion generally causes the hollow spray to spread at a narrower angle, which cases a smaller crosswise penetration, a larger lengthwise penetration, less aggressive thinning of the fluid sheet, and a generally larger droplet size in the hollow spray 198. The foregoing spray characteristics are illustrated in more detail below with reference to FIGS. 10*a*–10*c* and 11*a*–11*c*.

FIGS. 10*a*–10*c* illustrate various embodiments of the forward portion 216 and corresponding radial passages 218 of the inner section 204. As illustrated, the nozzle 106 has a set of four longitudinal passages 184 and corresponding radial passages 218 directed inwardly toward the forward cavity 212. As illustrated in FIG. 10*a*, the radial passages 218 are disposed in a no-swirl configuration 248, which has the radial passages 218 directed straight inwardly from the longitudinal passages 184 to the forward cavity 212. Accordingly, the radial passages 218 do not facilitate any swirl in the fluid flowing to the forward cavity 212.

In FIG. 10*b*, the radial passages 218 are configured in a slight swirl configuration 250, which has the radial passages 218 directed at a slight angle from the longitudinal passages 184 and inwardly toward the forward cavity 212. Accordingly, the slight swirl configuration 250 causes the fluid to swirl about the forward portion 226 of the poppet 186 within the forward cavity 212 prior to exiting the nozzle 106 through the exit 232. This slight swirl configuration 250 also enhances the hollow spray 198 and the geometry of the uniform cross section 200 illustrated in FIGS. 8 and 9.

In FIG. 10*c*, the radial passages 218 are disposed in a maximum swirl configuration 252, which has the radial passages 218 directed inwardly toward the lower cavity 212 at a maximum angle between the longitudinal passages 184 and the forward cavity 212. For example, the radial passages 218 may be disposed tangential to the forward cavity 212 to provide a maximum angle to facilitate swirl of the fluid flowing into the forward cavity 212 about the forward portion 226 of the poppet 186. Accordingly, this swirl produced in the forward cavity 212 also enhances the characteristics of the hollow spray 198 and the geometry of the uniform cross section 200, as discussed above with reference to FIG. 10b. Thus, the various configurations 248, 250 and 252 may be utilized to provide desired swirl within the forward cavity and exiting spray, and also to modify other flow characteristics and spray characteristics, such as those illustrated in FIGS. 11a–11c.

Figure 11A:
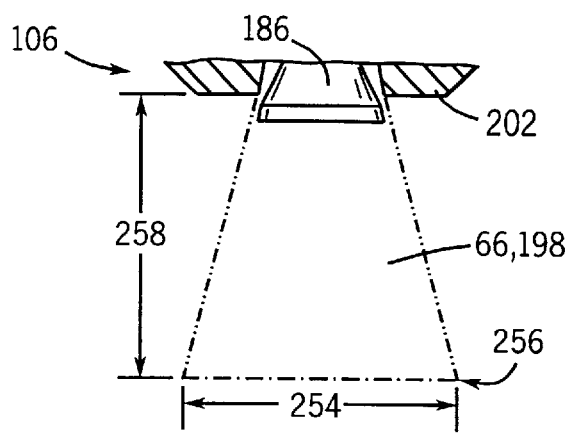
FIGS. 11A–C illustrate geometrical variations in the hollow spray correlated to the various fluid passage configurations of FIGS. 10A–C, respectively.
Figure 11B:
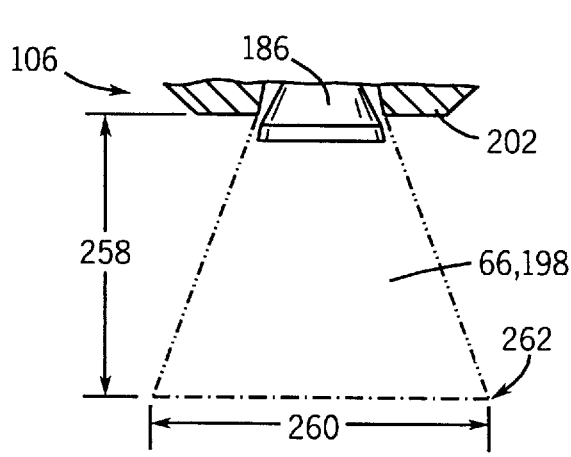
Figure 11C:
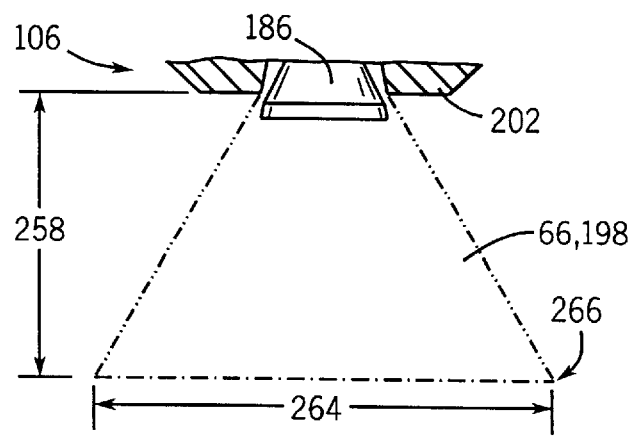

As illustrated in FIGS. 11a–11c, the various swirl configurations 248, 250 and 252 illustrated in FIGS. 10a–10c affect the dispersion of the hollow spray 198. In the no-swirl configuration 248 of the radial passages 218, a cross section 256 of the hollow spray 198 has a width 254 at a downstream distance 258. In the slight swirl configuration 250 of the radial passages 218, a cross section 262 of the hollow spray 198 has a width 260 at the downstream distance 258. In comparison to the no-swirl configuration 248, the hollow spray 198 produced by the slight swirl configuration 250 has a relatively larger width 260 than the width 254. The slight swirl configuration 250 also provides a greater crosswise spray penetration, a smaller lengthwise spray penetration, and a generally smaller spray droplet size than the no-swirl configuration 248. The cross section 262 also may vary considerably from the cross section 256. For example, the distribution of large and small fluid droplets may vary between the slight swirl configuration 250 and the no-swirl configuration 248. In the maximum swirl configuration 252 of the radial passages 218, a cross section 266 of the hollow spray 198 has a width 264 at the downstream distance 258. In comparison to the no-swirl configuration 248 and the slight swirl configuration 250, the hollow spray 198 produced by the maximum swirl configuration 252 has a relatively larger width 264 than both of the widths 254 and 260. The maximum swirl configuration 252 also provides a greater crosswise spray penetration, a smaller lengthwise spray penetration, and a generally smaller spray droplet size than both configurations 248 and 250. Accordingly, the cross-sectional and longitudinal geometry and entry orientation of the radial passages in the various swirl configurations 248, 250 and 252 may be utilized to vary the crosswise and lengthwise spray penetration, the mean droplet size and droplet distribution, and various other characteristics of the hollow spray 198.

It also should be noted that a single longitudinal passage 184 may be utilized in the nozzle 106 illustrated in FIGS. 10a–10c, or any other desired number of fluid passages 184 may be utilized within the scope of the present technique. For example, one or more of the longitudinal passages 184 may feed a ring shaped passage, which then feeds the forward cavity 212 via any number of the radial passages 218. Similarly, any suitable geometry of the longitudinal passage(s) 184 and the radial passages 218 may be utilized within the scope of the present technique. For example, the passages 184 and 218 may have a cylindrical cross section, a square cross section, or any other uniform or varying cross section to enhance the fluid flow and provide the desired hollow spray 198.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A nozzle comprising:
   a nozzle body comprising:
      an axial conduit comprising rear and forward portions;
      an outwardly opening poppet disposed in the axial conduit and configured for controlling fluid flow through the forward portion and producing a hollow spray; and
   a plurality of fluid conduits having lateral portions coupling the plurality of fluid conduits to the forward portion, the lateral portions being configured for controlling fluid swirl through the forward portion and around the poppet.

2. The nozzle of claim 1 wherein the forward portion comprises an outwardly expanding geometry 3. The nozzle of claim 2 wherein the rear portion comprises a cylindrical geometry.

4. The nozzle of claim 1 wherein the plurality of fluid conduits comprise longitudinal portions disposed about the axial conduit.

5. The nozzle of claim 1 wherein the lateral portions have a desired angle relative to the forward portion, the described angle being configured to control the fluid swirl and geometry of fluid spray produced by the nozzle.

6. The nozzle of claim 5 wherein the fluid spray comprises a substantially conical spray pattern having a dispersion width correlated to the fluid swirl.

7. The nozzle of claim 5 wherein the lateral portions terminate symmetrically at the forward portion.

8. The nozzle of claim 5 wherein the lateral portions terminate perpendicular to the forward portion.

9. The nozzle of claim 5 wherein the lateral portions terminate tangential to the forward portion.

10. The nozzle of claim 5 wherein the lateral portions terminate oblique angles relative to the forward portion.

11. The nozzle of claim 1 wherein the outwardly opening poppet comprises a rear section disposed sealingly and movably within the rear portion.

12. The nozzle of claim 11 wherein the outwardly opening poppet comprises a conical head having a seat portion configured for closing the nozzle at an exit of the axial conduit.

13. The nozzle of claim 1 comprising a drive assembly coupled to the nozzle body, wherein the drive assembly is configured for moving the outwardly opening poppet between open and closed orientations, the open orientation forming a ring-shaped passage between the axial passage and the outwardly opening poppet.

14. The nozzle of claim 13 wherein the drive assembly comprises a spring assembly coupled to the outwardly opening poppet for biasing the outwardly opening poppet inwardly toward the closed orientation.

15. The nozzle of claim 13 wherein the drive assembly comprises a pump assembly coupled to the plurality of fluid conduits.

16. The nozzle of claim 15 wherein the pump assembly is configured to provide a pulsed find supply.

17. The nozzle of claim 1 wherein the nozzle body comprises inner and outer bodies, the inner body comprising the rear portion and a longitudinal portion of the plurality of fluid conduits, and the outer body comprising the forward portion and the lateral portion.

18. A spray system comprising:
   a nozzle assembly comprising:
      an outwardly opening flow controller disposed in an axial passage configured to produce a hollow spray; and a fluid passage having at least one lateral passage configured to couple the fluid passage to a forward portion of the axial passage, wherein the at least one lateral passage comprises an angular portion configured for controlling fluid swirl through the forward portion and around the flow controller.

19. The spray system of claim 18 comprising a fluid supply assembly coupled to the fluid passage.

20. The spray system of claim 19 wherein the fluid supply assembly comprises a pump assembly.

21. The spray system of claim 20 wherein the fluid supply assembly comprises a reciprocating drive assembly coupled to the pump assembly.

22. The spray system of claim 20 wherein the fluid supply assembly is configured for a fuel.

23. The spray system of claim 22 comprising a timing assembly coupled to the pump assembly, wherein the timing assembly is configured to coordinate fuel injection by the nozzle assembly with ignition by an ignition assembly.

24. The spray system of claim 18 comprising a spring assembly coupled to the outwardly opening flow controller for biasing the outwardly opening flow controller inwardly toward a closed position.

25. The spray system of claim 18 wherein the outwardly opening flow controller comprises a poppet.

26. The spray system of claim 18 wherein the outwardly opening flow controller comprises a conical head having a seat portion configured for closing the nozzle assembly at an exit of the axial passage.

27. The spray system of claim 18 wherein the axial passage comprises an outwardly expanding geometry.

28. The spray system of claim 18 wherein the fluid passage comprises a plurality of fluid conduits.

29. The spray system of claim 28 wherein the plurality of fluid conduits comprises a longitudinal portion disposed about the axial passage and the angular portion terminating at the forward portion.

30. The spray system of claim 28 wherein the plurality of fluid conduits comprises a plurality of angular portions terminating symmetrically about the forward portion.

31. The spray system of claim 18 wherein the angular portion terminates at an oblique angle with the forward portion.

32. The spray system of claim 18 wherein the angular portion terminates tangential to the forward portion.

33. The spray system of claim 18 wherein the fluid swirl produced by the angular portion is configured to control geometrical characteristics of fluid spray produced by the nozzle assembly.

34. The spray system of claim 33 wherein the geometrical characteristics comprise a dispersion rate correlated to the fluid swirl.

35. The spray system of claim 18 wherein the nozzle assembly comprises inner and outer bodies, the inner body comprising a longitudinal portion of the fluid passage, and the outer body comprising the forward portion and the angular portion.

36. A combustion engine comprising:
a combustion chamber;
an ignition assembly coupled to the combustion chamber;
a nozzle assembly coupled to the combustion chamber, comprising:
an outwardly opening flow controller disposed in an axial conduit configured to produce a hollow spray; and
a fuel conduit having at least one lateral passage configured to couple the fuel conduit to a forward portion of the axial conduit, wherein the at least one lateral passage is configured for controlling fuel swirl through the forward portion and around the flow controller; and
a fuel delivery assembly coupled to the nozzle assembly.

37. The combustion engine of claim 36 wherein the nozzle assembly comprises inner and outer bodies, the inner body comprising a rear portion of the axial conduit and a longitudinal portion of the fuel conduit, and the outer body comprising the forward portion and the angular portion.

38. The combustion engine of claim 36 wherein the fuel delivery assembly comprises a pump assembly.

39. The combustion engine of claim 36 wherein the fuel conduit comprises a plurality of passes.

40. The combustion engine of claim 39 wherein the plurality of passages comprises a plurality of angular portions terminating symmetrically about the forward portion.

41. The combustion engine of claim 36 wherein the angular portion terminates at an oblique angle with the forward portion.

42. The combustion engine of claim 36 wherein the fluid swirl produced by the angular portion is configured to control geometrical characteristics of fluid spray produced by the nozzle assembly.

43. The combustion engine of claim 42 wherein the geometrical characteristics comprise a dispersion rate correlated to the fluid swirl.

44. A method for producing a spray comprising:
manipulating an outwardly opening nozzle to control flow through a forward portion of an axial passage and to produce a hollow spray; and
feeding fluid angularly to the forward portion to control rotation of the fluid in the forward portion and around the nozzle and control geometrical characteristics of a spray formed at an exit of the forward portion.

45. The method of claim 44 wherein manipulating the outwardly opening nozzle comprises moving a poppet between seated and unseated positions with the exit.

46. The method of claim 45 wherein moving the poppet between seated and unseated positions comprises reciprocally driving a head portion of the poppet out of the exit and springably returning the head portion back into the exit.

47. The method of claim 45 wherein moving the poppet between seated and unseated positions comprises opening and closing a ring-shaped passage between the poppet and the axial passage.

48. The method of claim 44 wherein feeding fluid angularly to the forward portion comprises feeding fluid through a conduit, which is separate from the axial passage and terminates at an oblique angle with the forward portion.

49. The method of claim 48 wherein feeding fluid through the conduit comprises feeding fluid trough a plurality of lateral passages terminating symmetrically about the forward portion.

50. The method of claim 48 comprising adjusting the oblique angle to provide the desired dispersion of the spray.

51. The method of claim 48 comprising pumping the fluid into the conduit.

52. The method of claim 51 comprising pulsatingly feeding the fluid into the conduit.

53. The method of claim 44 comprising injecting the spray into a combustion engine.

54. The method of claim 53 comprising temporally coordinating a pulse of the spray with an ignition pulse produced by an ignition assembly coupled to the combustion engine.

55. A method for forming a spray assembly comprising:
providing a nozzle body comprising an axial passage and a fluid passage coupled to a forward portion of the axial passage;

providing an outwardly opening flow controller for the axial passage to control fluid flow from the fluid passage and through the forward portion and to produce a hollow spray; and terminating the fluid passage angularly at the forward portion to control fluid swirl in the forward portion and around the flow controller.

56. The method of claim 55 wherein providing the nozzle body comprises providing an inner body having a rear portion of the axial passage and a longitudinal portion of the fluid passage.

57. The method of claim 56 wherein providing the nozzle body comprises providing an outer body having the forward portion and a lateral portion of the fluid passage terminating at an oblique angle relative to the forward portion.

58. The method of claim 57 comprising inserting the inner body into a cavity of the outer body, and forming the lateral portion between the inner and outer bodies.

59. The method of claim 55 wherein providing the nozzle body comprises orienting the fluid passage with the forward portion at an angle configured to provide a desired degree of fluid swirl through the forward portion.

60. The method of claim 59 comprising coupling a plurality of fluid passages to the forward portion.

61. The method of claim 55 comprising movably disposing the outwardly opening flow controller in the axial passage, and forming a ring-shaped exit from the forward portion between the axial passage and the outwardly opening flow controller in an open position.

62. The method of claim 61 comprising coupling a spring assembly to the outwardly opening flow controller to bias the outwardly opening flow controller inwardly toward a closed position.

63. The method of claim 55 comprising coupling a pump assembly to the fluid passage.

\* \* \* \* \*